April 14, 1964 R. HENATSCH 3,129,294

CALL TRANSMITTING DEVICES

Filed Feb. 26, 1958 2 Sheets-Sheet 1

INVENTOR.

Reynold Henatsch

INVENTOR.

Reynold Henatsch

BY

United States Patent Office 3,129,294
Patented Apr. 14, 1964

3,129,294
CALL TRANSMITTING DEVICES
Reynold Henatsch, 300 E. 61st St., New York, N.Y.
Filed Feb. 26, 1958, Ser. No. 717,743
3 Claims. (Cl. 179—90)

This invention relates to call transmitting devices. It refers more specifically to a method of operating devices used in call transmitting systems in which a code consisting of a series of abstract characters must be registered on an impulse transmitting mechanism and transmitted to a central office as a series of interruptions of a current through the system.

The well-known practice in such devices at the present time is the use of a finger-hole disk in which the character is first selected and then registered on the impulse-transmitting mechanism by twirling the disk in a clockwise direction as far as it will go. When the finger is withdrawn the disk is spring-urged to its original starting position at a governed speed, during which time the circuit through the system is broken and made a number of times corresponding to the character selected. An intricate mechanism in the central office records such series of interruptions and automatically makes the necessary connection to put the caller in touch with the party he is calling.

It may be pointed out that this practice is wasteful both of time and energy. It is my understanding that it is the general practice today to have the circuit-interrupting mechanism which creates the impulses which are sent to the central office at a speed of approximately 10 interruptions per second, with a permissable variation of between 9 and 11 and sometimes as high as 14. If the interval between interruptions is 0.2 of a second or more, it is detected by the central office equipment as a separation between characters. This permits the well-known practice of registering the call-number characters in succession on the same equipment, the necessary break between characters being provided by the time it takes to twirl a selected character to the point where the finger is removed. However, if the central office can pick up the division between the numbers 1 and 2, which can be dialed in quick succession, the higher numbers such as 9 and 0 require a much greater time for dialing than is absolutely necessary. Any system which eliminates the return movement may be considered a time and energy saver.

In this application I disclose not only ways in which time and energy can be saved with an equipment which eliminates the return movement between the registering of the characters, but a combination of elements which would make possible automatic dialing which is controlled by means of a re-usable file card, in a practical way without intricate and expensive equipment.

Since many subscribers maintain a supplemental directory of numbers which are most frequently called, I propose that such supplemental directory be in the form of a filing card system, but instead of using the card merely to obtain the number, which must then be dialed in the usual manner, I propose that the card be so constructed that it would be capable of obtaining the number automatically when it is placed in contact with the necessary equipment for translating the information which is concretely represented on the card. In practically the same amount of time that it takes to dial each character separately in the manner now generally prevalent, to make one transitory connection, a file card could be prepared which would make the call automatically innumerable times.

My main object is to provide a method and device for obtaining certain numbers frequently called in a simpler and easier manner than the one now generally used.

Another object is to make it possible for the subscriber to make any call of his choosing in the simplified manner referred to above without limiting him to certain fixed preset combinations which might be incorporated in any particular hand-set.

Another object is to make such a method practical by making it simple and easy for the subscriber to assemble and arrange his own filing cards from standard parts which would be made available to him.

Another object is to make it possible to incorporate such a desirable feature in any hand-set, or make it a convenient adjunct, using equipment readily adaptable for use with an ordinary hand set and in approximately the same price-range.

Another object is to provide a method of telephoning which would be much easier for certain handicapped persons who find the present method difficult, especially blind people.

Since the objects, as stated, cover a new and different method for making certain telephone calls, as well as apparatus which would make it possible, I am illustrating different apparatus with which the method could be carried out. The best mode contemplated is shown in FIGURES 1 through 8.

Figure 1:
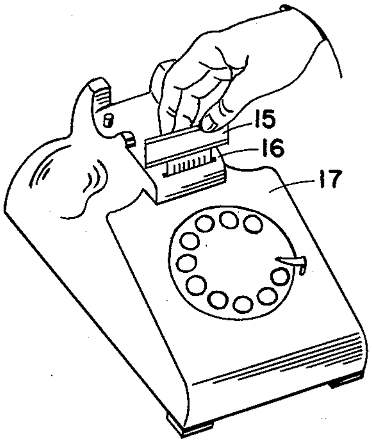
FIGURE 1 is a general perspective view of a telephone hand-set showing an automatic dialing card, which has just been removed from a convenient file, being inserted into a slot provided for it in a hand-set.
Figure 2:
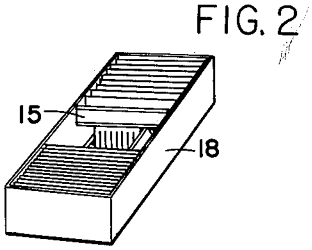
FIGURE 2 is a perspective view of a box file containing the automatic dialing cards.

It is conceivable that for some purposes certain telephones could be made to operate entirely in this automatic fashion, which would eliminate the need for a hand-set to provide a separate mechanism by which certain infrequent calls could be "dialed" in the usual manner. However, the most practical method would be a combination of the two methods, as one need not interfere with the other. In FIGURE 1 is shown how the relatively small equipment necessary could be incorporated right in the hand-set intended for dialing in the usual manner. A separate circuit making and breaking device is provided for each method but the impulses could be sent on a common wire to the central office. It is to be understood, however, that use of this invention is not limited to the particular type of hand-set which is shown in the illustrations.

In FIGURE 1 an automatic dialing card 15 is being inserted in a slot 16 provided for it in a hand-set 17 which is also equipped to dial calls in the usual manner. As soon as the racking-up operation is performed by applying a pressure on card 15, it is immediately returned to its place in the box file 18, which is kept in a convenient location. To be more adaptable for use with a narrow slot, these cards are shown with the unnecessary part of the card cut away.

Figure 3:
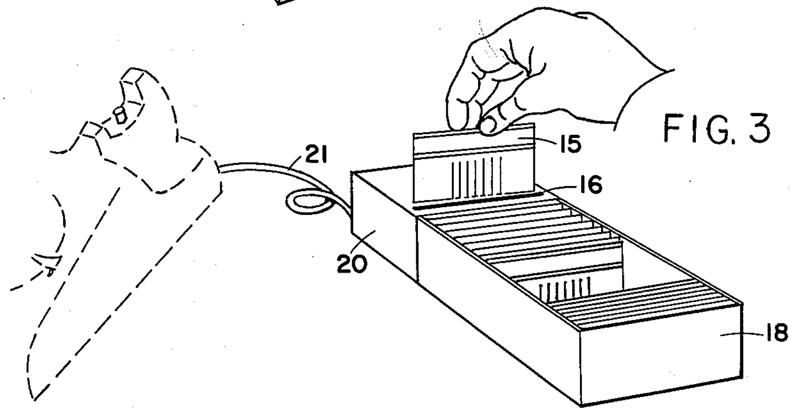
FIGURE 3 shows an alternate method in which the impulse registering mechanism is conveniently installed in a compartment at the back of the file which is plugged into the hand-set so that interruptions in the circuit can be transmitted to the central office in the usual manner.

In FIGURE 3 is shown an alternate method in which the card 15 retains its rectangular shape and is inserted through a slot 16 in a compartment 20 in the rear of the file box 18, where the registering mechanism is located instead of being incorporated in the hand-set proper. A wire 21 connects the registering mechanism with the hand-set so the impulses can be transmitted to the central office in the usual manner.

Figure 4:
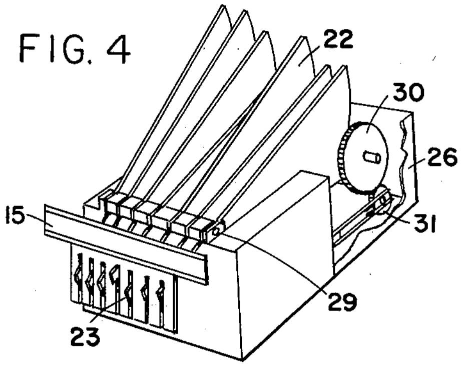
FIGURE 4 is a perspective view showing a type of mechanism in which an automatic dialing card has just racked up, simultaneously, separate levers for each character to be registered.
Figure 5:
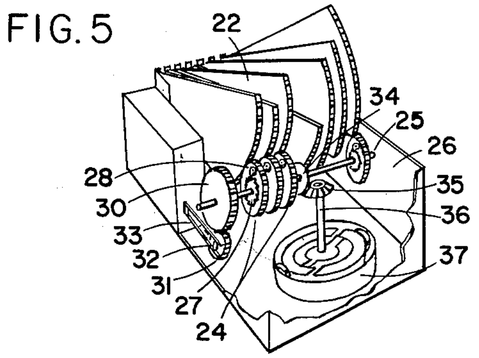
FIGURE 5 is a perspective view of the opposite end of the mechanism in FIGURE 4, showing how the registering levers co-operate with a common circuit interrupting mechanism which is controlled at a governed speed.

FIGURES 4 and 5 show a unitary structure which could be used in either of the illustrations shown. In this installation, a separate registering lever, of which 22 is a typical example, is maintained for the registering of each character. Seven levers are shown, assuming that three are required for the exchange and four for the call-number of the subscriber. As the dialing-card 15 is pressed down on the ends of the registering levers, which are revolvable on axis 29, the ends of the levers 23 assume positions according to the length of the slots in the dialing-card and the opposite ends of the levers are raised to various heights correspondingly determined by the length of the slots in the card.

By referring to FIGURE 5 it will be seen how each operating lever, of which 22 is a typical example, co-operates with its own spur-wheel 24 which is movably mounted on axis 25 which is journaled in bearings on the side wall of housing 26. Each spur-wheel 24 has next to it a sprocket-wheel 27 which is securely attached to axis 25. A spring-urged pawl 28 attached to the side of each spur-wheel 24 permits the spur-wheel to move in a clockwise direction when the registering lever is being hoisted without moving the axis 25, but when the registering lever is lowered and spur-wheel 24 is moved in a counter-clockwise direction, the pawl engages the sprocket-wheel 27 which causes the axis 25 to be revolved in a counter-clockwise direction. When axis 25 is revolved in a counter-clockwise direction, spur-wheel 30, which is securely attached to it near one end, is moved in the same direction, revolving a smaller spur-wheel 31 in a clockwise direction, causing a small cam 32 to be revolved with it. Cam 32, being situated between a pair of pulsing contact springs 33, causes these springs to be alternately spread apart and brought together to cause interruptions in the circuit which can be transmitted to the central office as impulses.

In the central portion of FIGURE 5, three of the spur-wheels 24 have been omitted from the drawing to show how the movement of axis 25 can be controlled at a governed speed. A beveled gear 34 which is securely fastened to axis 25 meshes with another bevel gear 35 mounted on a shaft 36 supported from the base of housing 26. Mounted to be rotated with shaft 36 is a governor 37 which controls the speed of axis 25.

Figure 6:
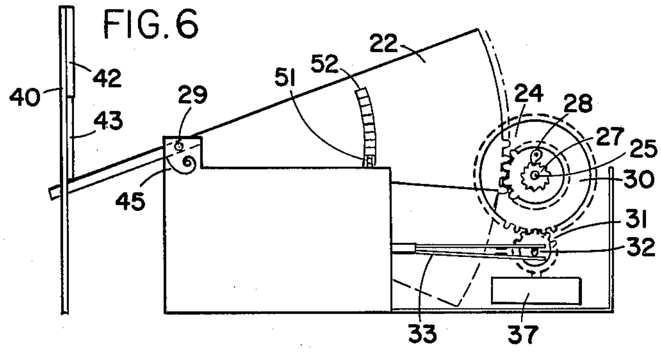
FIGURE 6 is a side view of one typical registering lever showing how it co-operates with a common circuit breaking and making mechanism to produce the necessary impulses.
Figure 7:
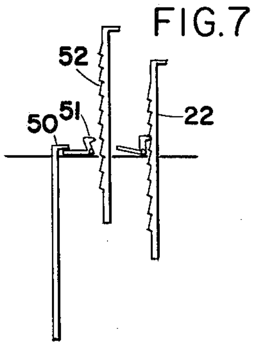
FIGURE 7 is an end view of three of the registering levers, showing how they are released to operate in succession.
Figure 8:
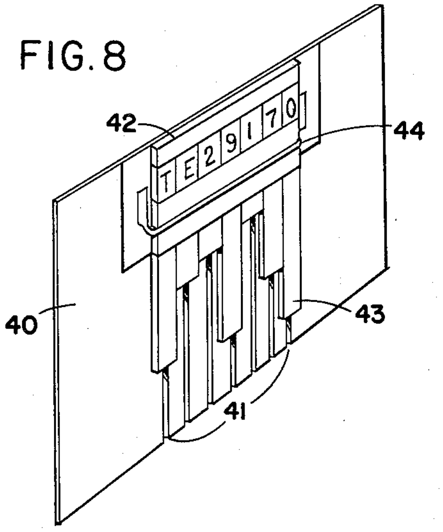
FIGURE 8 is a back view of a file card showing how any desired call-number can be constructed from standard parts without the use of special equipment.
Figure 9:
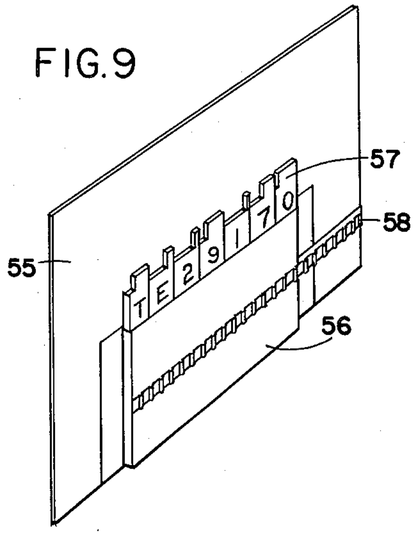
FIGURE 9 is a back view of an alternate file card which could be used with the method shown in FIGURES 10, 11 and 12.
Figure 12:
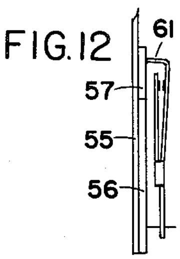
FIGURE 12 is the same view showing the springs spread apart and the switch open to interrupt the circuit, thereby transmitting an impulse to the central office.
Figure 11:
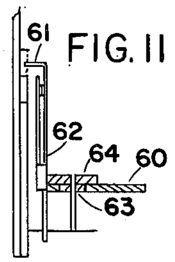
FIGURE 11 is an end view of an automatic dialing card shown in FIGURE 9 at 11—11, showing a pulsating pair of contact springs in closed position.

The operation of the apparatus disclosed can be followed by referring to FIGURES 6, 7 and 8. For each call which is to be made in the automatic manner revealed above, a card such as that shown in FIGURE 8 must first be assembled and placed in a convenient box file. This card could be assembled from standard stock parts which would be made available to the subscriber. A thin rigid cardlike member 40 with seven slots 41 extending upward from the lower edge of the card, is equipped in the upper portion of the rear side with a pocket 42 into which seven rigid bars 43 of the same width could be fitted snugly. These bars would be of different lengths, varying according to the number or letter they bear. For example, the bar bearing the numeral 0 which in telephone practice is number 10, would be the longest and that bearing number 1 would be the shortest. It will be seen that filling the pocket with bars bearing the characters which represent the abstract call-number designated for a certain subscriber, would have the effect of creating a concrete representation of that call number by shortening the slots to relative lengths which can be identified with the abstract call-number. A simple means, such as the spring 44 could be used to temporarily lock the bars in position but would permit the bars to be withdrawn by a slight pressure to be re-used to make other combinations. It is to be understood that although letters, as well as numbers, are used in telephone practice, the effect of registering the letters is the same as that of registering the number to which that letter is assigned.

In FIGURE 6, which is a side view of a typical registering lever, it will be seen how the proper number of impulses can be transmitted to the central office according to the height to which a registering lever has been raised in the racking-up operation in which the file card is used. It will be seen that the number of impulses transmitted depends upon the proper ratio between spur-wheels 30 and 31, as well as the proper ratio between spur-wheel 24 and registering lever 22. This information would permit design of equipment to meet specific requirements. For instance, a more compact unit could be made by utilizing smaller file cards with shorter slots in conjunction with shorter registering levers which would be raised a shorter distance, in which case a different ratio would be used between spur-wheels 30 and 31, to increase the speed of the latter. Even the shape of cam 32 would determine the number of interruptions of the circuit that could be made by one registering lever.

It must be realized that the apparatus shown in my disclosure is but a small part of the equipment necessary for so vast a network as a telephone system, which may or may not be uniform throughout. It should be understood, therefore, that the drawings are intended to reveal but one possible means by which my concept for automatic filing-card dialing could be carried out. I wish to point out that without a new concept which does not involve the well-known finger-hole disk, the concept of using filing cards for automatic dialing is not obvious. Although control cards, such as those used in data-processing equipment have been used for sometime, it apparently has not been obvious that filing cards could be used for automatic telephoning. The data-processing cards involve delicate and intricate equipment which is not practical in a telephone hand-set.

I am well aware that patents have been issued from time to time for automatic telephone dialing devices but those which have come to my attention have accepted the finger-hole disk as inevitable and have involved equipment to produce the same motion which is usually done by hand. My claims are based on apparatus and methods which are a new concept in telephony, but which would not disrupt the entire existing systems. By the simple expedient of making it possible for an ordinary subscriber to assemble his own file cards for calling any numbers of his own choosing, I widen the concept of my invention far beyond the scope of an arrangement which a telephone company might be able to make to enable a subscriber to make a certain or a limited number of calls by pushing a button. I reveal the main principles involved in the cencept so that the disclosure can be flexibly adapted to meet any specific requirements. While raising an individual registering lever to a certain height from which it would register a certain specified number of impulses has the same effect as selecting a character by placing a finger in a hole of a disk and then revolving it, I accomplish other unobvious and unexpected results, such as enabling a person to make all of the selections simultaneously, and eliminating errors which are apt to occur when the human element is involved in each selection.

A filing card marked with a Braille designation could easily be located by a blind person and a desired number could be easily secured by inserting the card in a slot, thereby eliminating seven tedious twirling operation.

After disclosing the wide adaptability of my concept by disclosing a simple practical manner in which accurate file cards could be assembled for any call-number of a subscriber's choosing, how the registering of individual characters could be done by separate levers to eliminate time and energy required by the present generally used method and how a circuit could be interrupted at a certain controlled speed to transmit impulses to the central office, I reveal in FIGURE 7 a simple means by which the registering levers could be made to operate successively. Each lever, except the first would be equipped with a notched surface and a small spring-urged catching-device to retain the lever at any height to which it has been raised. Since the first lever is not so equipped, it would begin to descend immediately after the pressure of the card is removed, thus beginning the registering process. As it reaches its bottom or normal position, a small projection 50 trips the catching-device 51 which disengages it from the notched surface 52 on the side of the next registering lever. The second lever then begins its descent, registering the proper number of impulses according to the height to which it has been raised and when it reaches the bottom, it, in turn, trips a catching-device similar to 51, which releases the third lever and so on until all the characters are registered.

Since it is my intention to claim a method for making automatic phone connections by use of filing cards, I disclose in FIGURES 9, 10, 11 and 12 how the method could be carried out with a different apparatus than that revealed in the first eight figures, thereby substantiating my contention that the method I am claiming is not merely the function of the apparatus disclosed.

Figure 10:
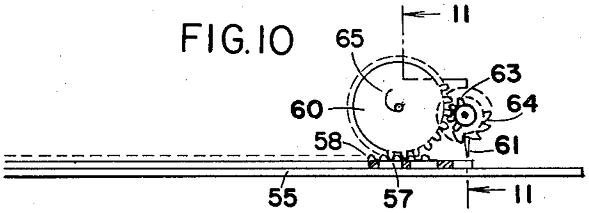
FIGURE 10 is a plan view of an alternate method for converting the call-number into impulses by inserting the card endwise.

In this alternate apparatus I do not make use of separate registering levers for each character. A somewhat similar rigid member, suitable for a filing card 55, is equipped on the back side with a pocket 56 in which seven bars 57 of equal width and length are inserted to make a concrete representation of the abstract call-number. At their upper end, however, these bars have portions cut away to make them identifiable with numbers from 1 to 10, so that by selecting bars bearing the characters of the call-number desired, a concrete representation of the call-number is constructed. Relatively near the bottom of the back side of the card a racklike structure 58 engages with a pinion 60 when inserted endwise in a slot, as shown in FIGURE 10. As the card is inserted in a slot from right to left in the plane view shown in FIGURE 10, a spring 65, attached to pinion 60, is wound up, so that as soon as pressure is removed from card 55, the pinion 60 begins to force the card out of the slot, due to the force of the spring. While emerging from the slot, a feelerlike end 61 of one of the pair of contact springs 62 is made to vibrate back and forth against the irregular ends of the bars in the pocket of the card. This vibrating movement is produced eleven times for each bar, this being a sufficient number of times to register ten impulses required for an 0, with one in which the circuit is not broken, which enables the central office to differentiate between characters.

The vibrations are produced by a small sprocket-wheel 64 attached to a small spur-wheel 63 which is moved by pinion 60 as it is spring-urged back to its normal position. Each tooth on the sprocket urges the pair of contact springs toward the card and then allows it to spring back. By referring to the position of the contacting springs shown in FIGURES 11 and 12, it will be seen that if the feelerlike end 61 of one of the springs comes in contact with a portion of a bar as it is pressed toward the card, the contact elements located between the springs will be spread apart to interrupt the circuit causing an impulse to be transmitted but if the feelerlike end 61 of the spring strikes a place where the bar has been cut away, the springs will not be separated and the circuit will not be broken.

After describing above certain specific and alternative embodiments of my invention, it is my intention by the appended claims, which include both generic and specific, to cover all such modifications as fall within the true spirit and scope of the invention.

What I claim is:

1. In an automatic telephone apparatus in which dial pulses are transmitted corresponding to pre-selected characters of a call-number, in combination; means for making and breaking a circuit to send dial pulses to a central station; a plurality of adjustable levers, each lever having a geared sector; a common pulsing cam shaft; a plurality of spur gears, there being one spur gear associated with each one of the aforementioned adjustable levers, said spur gears having a rotatable relationship with the common pulsing shaft by means of a one-way clutching device; an adjustable impulse control means for setting all levers at various adjustments which correspond with characters of the call number; means for placing the impulse control means in contact with the levers to set them simultaneously when pressure is applied; and means for urging the adjustable levers to normal position sequentially to actuate the dial pulsing mechanism in accordance with the position to which the levers are set.

2. The same as claim 1, said means of adjustable impulse control comprising a filing card member having multiple slots opening into one edge of a card; separate detachable bar members of various lengths which identify them with characters of the call-number; and means for temporarily attaching the bars to the cards adjacent to the slots to shorten the slots to lengths which correspond to the characters of the call-number.

3. With an automatic telephoning device having mechanisms for producing electrical impulses and a plurality of adjustable levers being simultaneously set and sequentially released to actuate an impulse switch through a common cam shaft, an adjustable impulse control member being used for adjusting the set of the levers, said adjustable impulse control member comprising, in combination, a file card having a plurality of identical slots opening into one edge; a plurality of separate bar members of various lengths; and means for temporary attachment of the bars to the card in a manner which shortens the slots to various lengths according to the length of the bars.

References Cited in the file of this patent

UNITED STATES PATENTS

| | | |
|---|---|---|
| 883,829 | Reuter | Apr. 7, 1908 |
| 2,044,470 | Devaux | June 16, 1936 |
| 2,386,486 | Mallina | Oct. 9, 1945 |
| 2,537,974 | Devaux | Jan. 16, 1951 |